United States Patent [19]
Dubois

[11] 4,189,167
[45] Feb. 19, 1980

[54] STEERING HEAD SET ASSEMBLY
[75] Inventor: Philippe Dubois, Rueil Malmaison, France
[73] Assignee: Nadella, Ruel-Malmaison, France
[21] Appl. No.: 860,874
[22] Filed: Dec. 15, 1977
[30] Foreign Application Priority Data
Dec. 20, 1976 [FR] France .............................. 76 38262
[51] Int. Cl.² .......................................... B62K 21/06
[52] U.S. Cl. .................................. 280/279; 308/174; 308/207 A; 308/216; 308/227
[58] Field of Search ............... 280/279, 280; 308/174, 308/175, 176, 207 R, 207 A, 216, 227

[56] References Cited
U.S. PATENT DOCUMENTS

| 1,645,409 | 10/1927 | Weyers | 280/279 |
|---|---|---|---|
| 1,921,883 | 8/1933 | Horger | 308/216 |
| 2,141,122 | 12/1938 | Boden | 308/216 X |
| 2,244,197 | 6/1941 | Hessler | 308/216 |
| 3,804,478 | 4/1974 | Andree | 308/227 |
| 3,934,956 | 1/1976 | Pitner | 308/174 |
| 4,033,645 | 7/1977 | Yamada | 308/207 A |

FOREIGN PATENT DOCUMENTS

| 28300 | 2/1925 | France | 280/279 |
|---|---|---|---|
| 472 445 | 1/1951 | Italy | 280/279 |

Primary Examiner—John P. Silverstrim
Attorney, Agent, or Firm—Roy B. Moffitt

[57] ABSTRACT

A steering head set assembly for a bicycle or the like wherein the conventional ball bearings are replaced by obliquely disposed needle or roller bearings, some embodiments including an elastic element to enable the bearings to be pre-stressed and provide vibration isolation.

5 Claims, 3 Drawing Figures

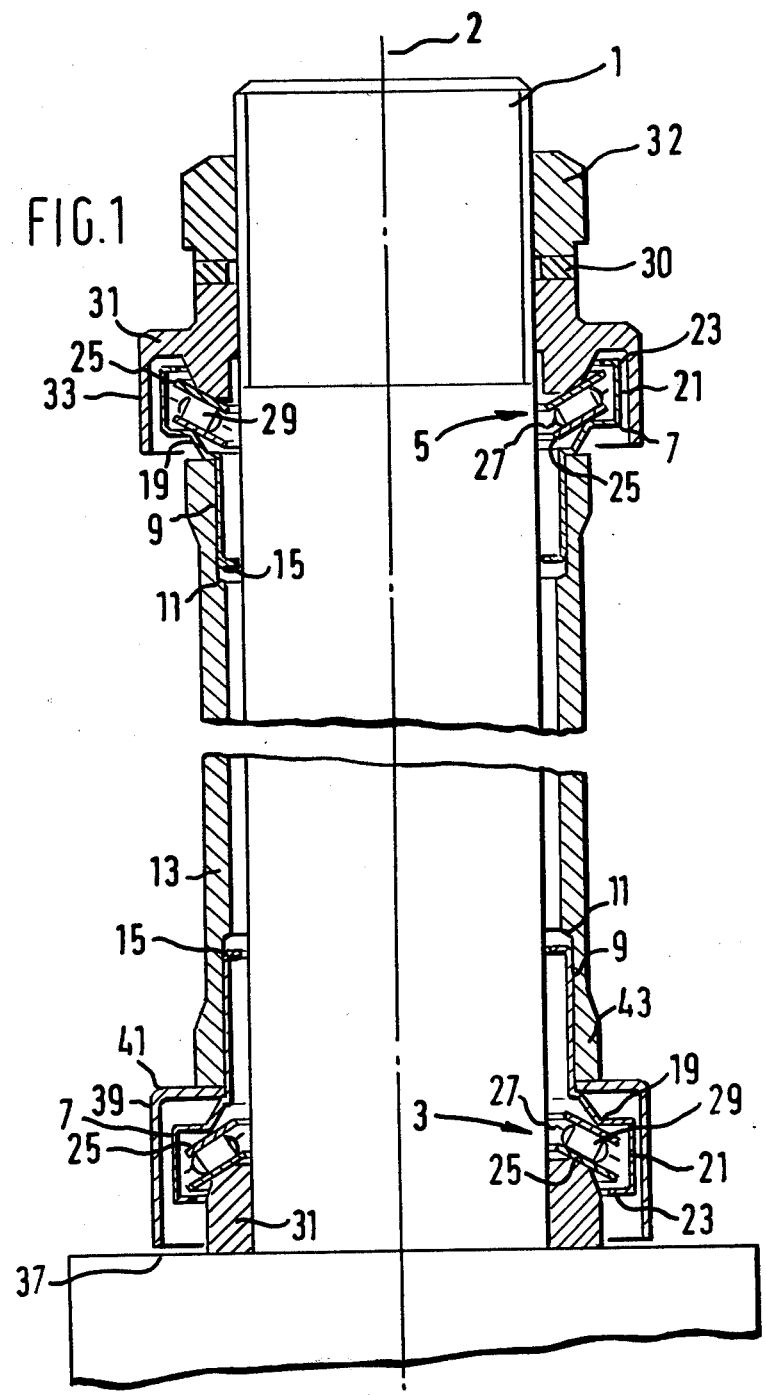

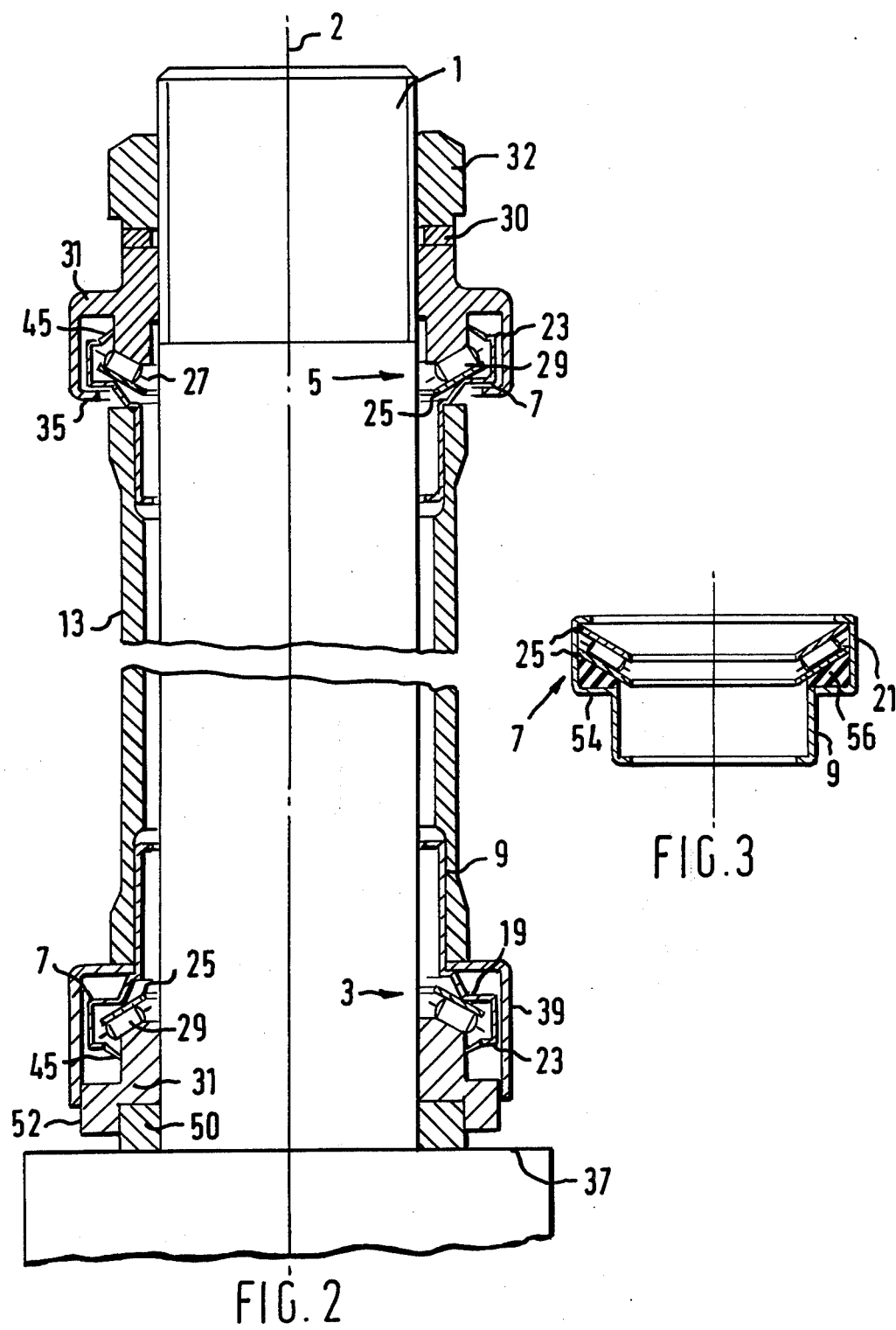

STEERING HEAD SET ASSEMBLY

This invention relates to steering head set assemblies for cycles, such as bicycles, tricycles, motor-cycles and mopeds.

A known cycle head set assembly comprises a pair of axially offset bearings each having ball bearings disposed between a bearing ring and a bearing cup co-operating with one end of a head tube. An embodiment of this known assembly has a bearing race or liner provided between the bearing ring and the ball bearings.

These known assemblies have the disadvantage of rapid deterioration of the bearings that is mainly due to the Brinell effect on the bearing races which gives a jerky rotation of the bearing, reducing steering sensitivity. In addition, the weight of such ball bearing head set assemblies is frequently high and this is contrary to the present day tendency towards weight reduction, especially for bicycles.

According to the present invention, a cycle steering head set assembly comprises a pair of axially offset bearings each having rolling elements disposed between a bearing ring and a bearing cup co-operating with one end of a head tube, wherein each bearing comprises caged, elongate, rolling elements disposed obliquely to the axis of said assembly and co-operating with a first, pressed metal, conical bearing race on said bearing cup.

The above, and other features of the present invention are illustrated by way of example in the accompanying drawings, wherein:

FIG. 1 is an axial section of a first embodiment of a bicycle head set assembly in accordance with the invention, FIG. 2 is a similar section of a second embodiment, and FIG. 3 is a detail section of an alternative form of bearing cup with an annular elastic cushion.

As shown by FIG. 1, a bicycle head set assembly comprises a fork axle 1, having an axis 2, mounted on two axially offset bearings 3 and 5 that are respectively located at the lower and upper ends of a bicycle head tube 13. Each bearing includes a bearing cup 7, preferably of pressed metal but possibly machined. The bearing cup 7 is formed with a first substantially cylindrical portion 9 held in a housing 11, one being provided at either end of the head tube 13, the housings 11 being larger diameter bores in the head tube. The cup portion 9 ends in an internal radial flange 15. The cup 7 has a second cylindrical portion 21, of larger diameter than portion 9, with an annular abutment shoulder 19 formed at the junction between the two cylindrical portions. The cup portion 21 also ends in an internal radial flange 23. Flange 23 serves to retain the elements of a bearing formed of cylindrical rolling elements 29 guided by a conical cage 27 to lie obliquely to the axis 2. The rolling elements 29 run between a pair of, preferably pressed metal, conical race plates 25 respectively abutting the abutment shoulder 19 of the bearing cup 7 and a bearing ring 31.

Bearing ring 31 for the lower bearing 3 rests on the fork shoulders 37. The bearing ring 31 for the upper bearing 5 is secured onto the threaded upper end of the fork axle 1 and is locked in place by a lock nut 32, with a washer 30 being interposed there between. At least one of the bearing rings 31, in this example the upper bearing ring, has a skirt 33 to envelope the second portion 21 of the upper bearing cup 7 and aid the assembly of the various bearing elements.

The bearing cup abutment shoulder 19 provides local support for the conical bearing race 25 allowing relative movement of the race for self alignment of bearing 3 or 5, this being necessary because it is difficult to produce bearing races having identical conicity.

A cylindrical casing 39 covers the lower bearing 3 and is held in place by an inturned flange 41 trapped between the lower end 43 of the head tube 13 and the lower bearing cup 7.

The bearing rings 31 can be machined, in which case they can be shaped so as to have an integral, conical bearing race to replace one of the races 25. An embodiment having such bearing rings is illustrated in FIG. 2 wherein like parts have been given like references. The bearing rings could otherwise be made of pressed metal sheet or a synthetic material.

In another embodiment, not shown, the bearing cup cylindrical portions 9 and 21 are connected by a conic section that bears on the ends of the head tube and serves directly as a bearing race.

A sealing ring 45 could be mounted on each bearing cup flange 23 to co-operate with the bearing ring 31, as illustrated in FIG. 2, and seal each bearing 3, 5.

FIG. 2 also illustrates the upper bearing ring 31 having an inturned radial flange 35 at the end of skirt 33 to unite and better protect all the bearing elements.

The bearings have hitherto been described as being formed by a conical abutment with cylindrical rolling elements which may be rollers or needles. Barrel-shaped or conical rolling elements could be used instead. Also the cage 27 could be made of metal or a synthetic material.

FIG. 2 also shows an elastic ring 50 interposed between the fork shoulders 37 and the lower bearing ring 31 that, preferably, has an axial collar 52 to house at least part of the elastic ring. This elastic ring 50 serves to isolate vibrations that might otherwise be transmitted from the forks to the steering head set and enables the bearings in the head set assembly to be pre-stressed to compensate for any settlement in the bearings of the type observed to occur in known head set assemblies after a period of time.

In an alternative form, shown by FIG. 3, the bearing cup 7 has a straight (or oblique) junction 54 between its cylindrical portions 9 and 21 (replacing the annular shoulder 19). An annular elastic cushion 56 rests on the junction 54 and supports the bearing race 25.

Such an alternative bearing cup could be used in either of the embodiments of the head set assemblies shown by FIGS. 1 and 2.

The elastic cushion 56 also permits relative movement of the bearing race 25 for self-alignment of the bearing.

I claim:

1. A steering head set unit comprising a head tube (13), a fork axle (1) rotatably extending through said head tube, and first and second bearing assemblies spaced axially apart at opposite ends of said head tube and peripherally surrounding said axle, each of said bearing assemblies comprising (a) a bearing ring (31) receiving said axle, (b) a bearing cup (7) having a first portion received in said tube and a second portion extending axially beyond said tube and peripherally surrounding said axle in spaced relation thereto such that said second portion and said axle define therebetween an annular cavity, (c) at least one pressed metal conical bearing race (25) received in said cavity and having oppositely facing sides lying obliquely to the longitudinal axis of said axle, (d) a set of caged, cylindrical thrust bearing rolling elements (29) arranged in an annulus in said cavity between said race and an opposing face of said bearing ring in rolling contact with one of the sides of said race to lie obliquely to the longitudinal axis of said axle, (e) an annular segment forming a part of said second portion and disposed radially outwardly of the sub-assembly of said race and said rolling elements in peripheral surrounding relationship thereto, and (f) an annular shoulder (19) forming a part of said second portion at a location that is intermediate and spaced from said annular segment and said first portion to seat against the other of the sides of said race to provide a support for said race while allowing relative movement of said race to provide for the self-alignment of said race.

2. The steering head set unit defined in claim 1 wherein the second portion of each bearing assembly is further formed with first and second angulated adjoining sections extending between said annular segment and said first portion and being integrally joined together at a corner which defines said annular shoulder and which seats against said race at an intermediate region thereof between the race's inner and outer peripheral edges, said first and second sections being spaced apart from said race except for the seating engagement of said corner against said race.

3. The steering head set unit defined in claim 1 or 44 wherein the conicity of the bearing race in said first bearing assembly converges toward said second bearing assembly, and wherein the conicity of said bearing race in said second bearing assembly converges toward said first bearing assembly.

4. A steering head set unit comprising a head tube (13), a fork axle (1) rotatably extending through said head tube, and first and second bearing assemblies spaced axially apart at opposite ends of said head tube and peripherally surrounding said axle, each of said bearing assemblies comprising (a) a bearing ring (31) receiving said axle, (b) a tubular bearing cup portion (21) peripherally surrounding said axle in spaced relation thereto such that said bearing cup portion and said axle delimit therebetween an annular cavity, (c) at least one pressed metal conical bearing race (25) received in said cavity and having oppositely facing sides lying obliquely to the longitudinal axis of said axle, (d) a set of caged, cylindrical thrust bearing rolling elements (29) arranged in an annulus in said cavity between said race and an opposing face of said bearing ring in rolling contact with one of the sides of said race to lie obliquely to the longitudinal axis of said axle, and (e) means engaging the other of said sides of said race for enabling self-aligning movement of said race comprising an annular shoulder (19), said shoulder and said bearing cup portion forming integral parts of a bearing cup (7) having an end portion received in said tube.

5. The steering head unit defined in claim 4 wherein the conicity of the bearing race in said first bearing assembly converges toward said second bearing assembly, and wherein the conicity of said bearing race in said second bearing assembly converges toward said first bearing assembly.

* * * * *